US006968204B2

(12) United States Patent
Whikehart et al.

(10) Patent No.: US 6,968,204 B2
(45) Date of Patent: Nov. 22, 2005

(54) NARROW BAND AND SPREAD SPECTRUM COMMUNICATION SYSTEM FOR A VEHICLE

(75) Inventors: J. William Whikehart, Novi, MI (US); John Elliott Whitecar, Plymouth, MI (US); Nicholas Lawrence Difiore, Farmington Hills, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 585 days.

(21) Appl. No.: 10/040,854

(22) Filed: Dec. 28, 2001

(65) Prior Publication Data

US 2003/0125007 A1 Jul. 3, 2003

(51) Int. Cl.[7] .................................. H04B 1/38
(52) U.S. Cl. ............... 455/552.1; 455/454; 455/435.2; 455/168.1; 375/148; 375/131
(58) Field of Search ................. 455/345, 344, 455/343, 130, 556.1, 168.1, 403, 462, 575.1, 455/569.2, 337, 569.1, 454, 545–552.1, 150.1, 455/176.1, 180.1, 188.1, 192.1, 266, 102, 455/104, 109, 207, 424, 425, 456.5, 456.6, 455/422.1, 414.1, 434, 435.2, 436, 444, 432.2, 455/515, 525, 561, 275; 375/131, 148, 135, 375/145, 141, 146, 261, 269, 270, 259, 295, 375/298, 301, 277, 149, 147, 130, 140, 367; 370/311, 320, 341, 342, 60, 94.1; 329/304, 329/122–123; 359/189; 379/59, 421; 381/311, 381/26, 183, 187, 167

(56) References Cited

U.S. PATENT DOCUMENTS

| | | | | | |
|---|---|---|---|---|---|
| 4,591,661 | A | * | 5/1986 | Benedetto et al. | 455/556.1 |
| 4,941,150 | A | * | 7/1990 | Iwasaki | 375/145 |
| 5,022,046 | A | * | 6/1991 | Morrow, Jr. | 375/130 |
| 5,073,899 | A | * | 12/1991 | Collier et al. | 375/135 |
| 5,243,640 | A | | 9/1993 | Hadley et al. | |
| 5,247,705 | A | | 9/1993 | Attig et al. | |
| 5,291,516 | A | * | 3/1994 | Dixon et al. | 375/131 |
| 5,978,689 | A | | 11/1999 | Tuoriniemi et al. | |
| 6,137,826 | A | * | 10/2000 | Boesch | 375/146 |
| 2002/0136278 | A1 | * | 9/2002 | Nakamura et al. | 375/148 |
| 2003/0199261 | A1 | * | 10/2003 | Higuchi | 455/168.1 |
| 2004/0029541 | A1 | * | 2/2004 | Baranowski et al. | 455/130 |

FOREIGN PATENT DOCUMENTS

| | | |
|---|---|---|
| DE | 19937507 A | 12/2001 |
| EP | 0896488 A | 10/1999 |

* cited by examiner

Primary Examiner—Edward F. Urban
Assistant Examiner—Charles Chow
(74) Attorney, Agent, or Firm—Brinks, Hofer, Gilson & Lione

(57) ABSTRACT

A vehicle communication system uses one or more components to process both narrow band signals and spread spectrum signals. A spread spectrum-like signal is generated from the narrow band signal. The spread spectrum-like signal is processed as a spread spectrum signal.

24 Claims, 3 Drawing Sheets

NARROW BAND AND SPREAD SPECTRUM COMMUNICATION SYSTEM FOR A VEHICLE

FIELD

This invention relates generally to dual mode electronic devices for a vehicle. More particularly, this invention relates to vehicle communication systems using both narrow band and spread spectrum signals.

BACKGROUND

Most vehicles (automobiles, trucks, buses, and the like) have an AM/FM radio or other narrow band signal receiver. Many vehicles have a cellular or personal communication services (PCS) telephone or another spread spectrum communication device. The cellular and PCS telephones usually use code division multiple access (CDMA) technology. The radio and cellular or PCS telephone typically are each self-contained units, which essentially have all the components for independent operation.

There are several approaches for integrating an audio or radio device with a cellular or PCS telephone such that one or more components are used by each device. One approach provides the output of both the radio and the cellular or PCS telephone through the same speaker or output system. The radio usually is switched-off when an incoming call is received. Another approach is to switch-off other operating devices such as the radio when a voice-command detection circuit is activated. In a further approach, an incoming ring signal is detected and converted into another audio signal or sound at the headset or output device. The audio signal from the radio is turned off in response to the ring signal.

SUMMARY

This invention provides a vehicle communication system using essentially one or more components to process both the narrow band and spread spectrum signals.

In one aspect, a narrow band and spread spectrum communication system for a vehicle has an antenna system connected to a signal processing circuit. The antenna system is operable to receive a narrow band signal and an input spread spectrum signal. The signal processing circuit is operable to generate a spread spectrum-like signal in response to the narrow band signal. The signal processing circuit is operable to generate an output communication signal in response to the spread spectrum-like signal and/or the input spread spectrum signal.

In another aspect, an integrated narrow band and spread spectrum communication system for a vehicle has an input signal processor connected to a narrow band receiver and an output signal processor. The input signal processor is operable to generate a spread spectrum-like signal in response to a narrow band signal from the narrow band receiver. The input signal processor is operable to generate an output spread spectrum signal in response to an input communication signal. The output signal processor is operable to generate an output communication signal in response to the spread spectrum-like signal. The output signal processor is operable to generate the output communication signal in response to an input spread spectrum signal.

In a method for integrating narrow band and spread spectrum signals in a vehicle communication system, a narrow band signal is received. A spread spectrum-like signal is generated in response to the narrow band signal. An output communication signal is generated in response to the spread spectrum-like signal.

Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF THE FIGURES

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

DETAILED DESCRIPTION OF THE PREFERRED EMBODIMENTS

Figure 1:
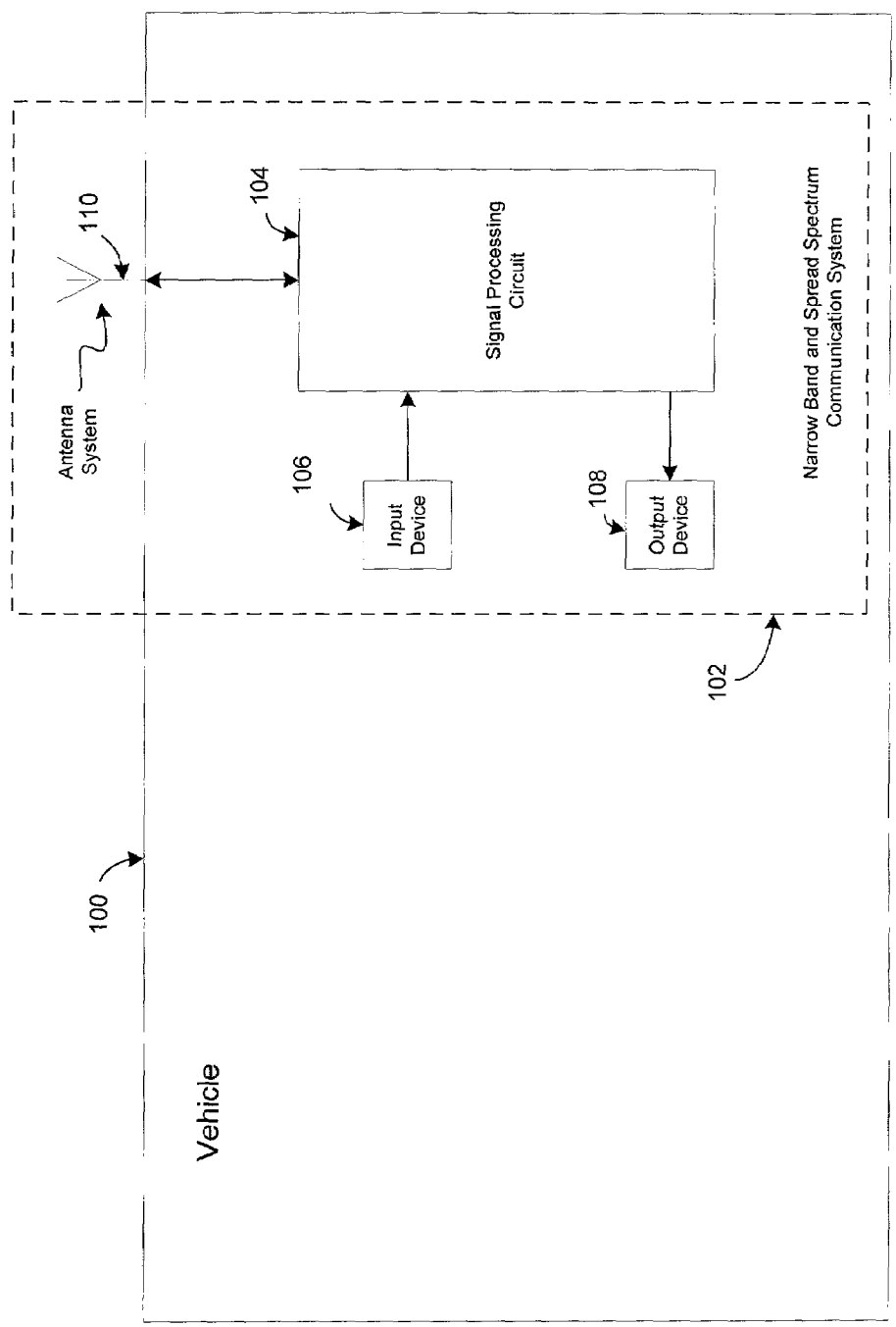
FIG. 1 represents a block diagram having a narrow band and spread spectrum communication system for a vehicle according to one embodiment.

FIG. 1 represents a block diagram of a narrow band and spread spectrum communication system 102 for a vehicle 100 according to an embodiment. The vehicle 100 may be an automobile, truck, bus, or the like. The narrow band and spread spectrum system 102 comprises a signal processing circuit 104 connected to an input device 106, an output device 108, and an antenna system 110. The narrow band and spread communication system 102 may be disposed partially or completely within one or more components (not shown) of the vehicle 100 such as a dashboard, a center column, a control panel, or the like. The narrow band and spread spectrum communication system 102 may be disposed partially or completely in a housing or similar containment device (not shown) attached or formed by the vehicle 100. The narrow band and spread spectrum communication system 102 may have other configurations and arrangements including those with fewer and additional components.

The signal processing circuitry 104 processes one or more narrow band signals and one or more spread spectrum signals. Narrow band includes a modulation technique in which a signal is transmitted as a radio frequency (RF) signal at or within a frequency band. Spread spectrum includes a modulation technique in which a signal is transmitted as an RF signal spread over a range of frequencies. The signal may be data, audio (voice, music, or other sound), or the like. The signal processing circuitry 104 converts the incoming narrow band signal into a spread spectrum-like signal for processing as a spread spectrum signal.

The narrow band signal may be an amplitude modulation (AM) signal or a frequency modulation (FM) signal. The AM signals are in the range of about 550 KHz through about 1610 KHz. The FM signals are in the range of about 88 MHz through about 108 MHz. The narrow band signals may have other frequencies.

The spread spectrum signals may be implemented by a code division multiple access (CDMA) protocol such as the standards IS-95 and IS-136 of the International Telecommunication Union (ITU). Other CDMA protocols may be used. The spread spectrum signals may be cellular signals or personal communication systems (PCS) signals. The cellular signals are about 800 MHz. The PCS signals are about 1900 MHz. The spread spectrum signals may have other frequency bands.

The input device 106 provides an input communication signal to the signal processing circuit 104. In one aspect, the input device 106 is connected via a wire or other electrical connection to the signal processing circuit 104. In another aspect, the input device 106 is connected via a short-range or local signal transmission system such as bluetooth technology. The input communication signal may be one or more input data or input audio signals. The input device 106 may comprise one or more data or voice input devices. A data input device may be a touch screen, key pad, and the like for conveyance of the input audio signal to the signal processing circuit 104. A voice input device may be a microphone or the like for conveyance of the input audio signal to the signal processing circuit 104. The input device 106 may be disposed with the signal processing circuit 104 or elsewhere in the vehicle 100. The input device 106 also may be disposed in a handset, headset, or other portable device.

The output device 108 receives an output communication signal from the signal processing circuit 104. The output communication signal may be one or more output audio or output data signals. In one aspect, the output device 108 is connected via a wire or other electrical connection to the signal processing circuit 104. In another aspect, the out device 108 is connected via a short range or local signal transmission system such as bluetooth technology. The output device 108 may comprise one or more data or audio output devices. A data output device may be a display screen, a data to audio translation device such as an e-mail vocalization system, or the like. An audio output device may be one or more speakers or the like. An audio output device may comprise one or more first speakers for incoming narrow band signals and one or more second speakers for incoming spread spectrum signals. The output device 108 may be disposed with the signal processing circuit 104 or elsewhere in the vehicle 100. The output device 108 may be disposed in a handset, headset, or other portable device. The output device 108 and input device 106 may be disposed in the same portable device.

The antenna system 110 comprises one or more antennas disposed at internal or external locations to the vehicle 100. The antenna system 110 may comprise a multimode antenna, which is operable at multiple frequency bandwidths such the narrow band and spread spectrum frequencies. In one aspect, the antenna system 110 comprises a first external antenna for one or more narrow band signals and a second external antenna for one or more spread spectrum signals. In another aspect, the antenna system 110 comprises a dual mode antenna for narrow band and spread spectrum signals. In a further aspect, the antenna system comprises a multimode antenna and another antenna. The multimode antenna is for AM and FM narrow band signals. The other antenna is for spread spectrum signals. The antenna system 110 may have other arrangements and configurations.

Figure 2:
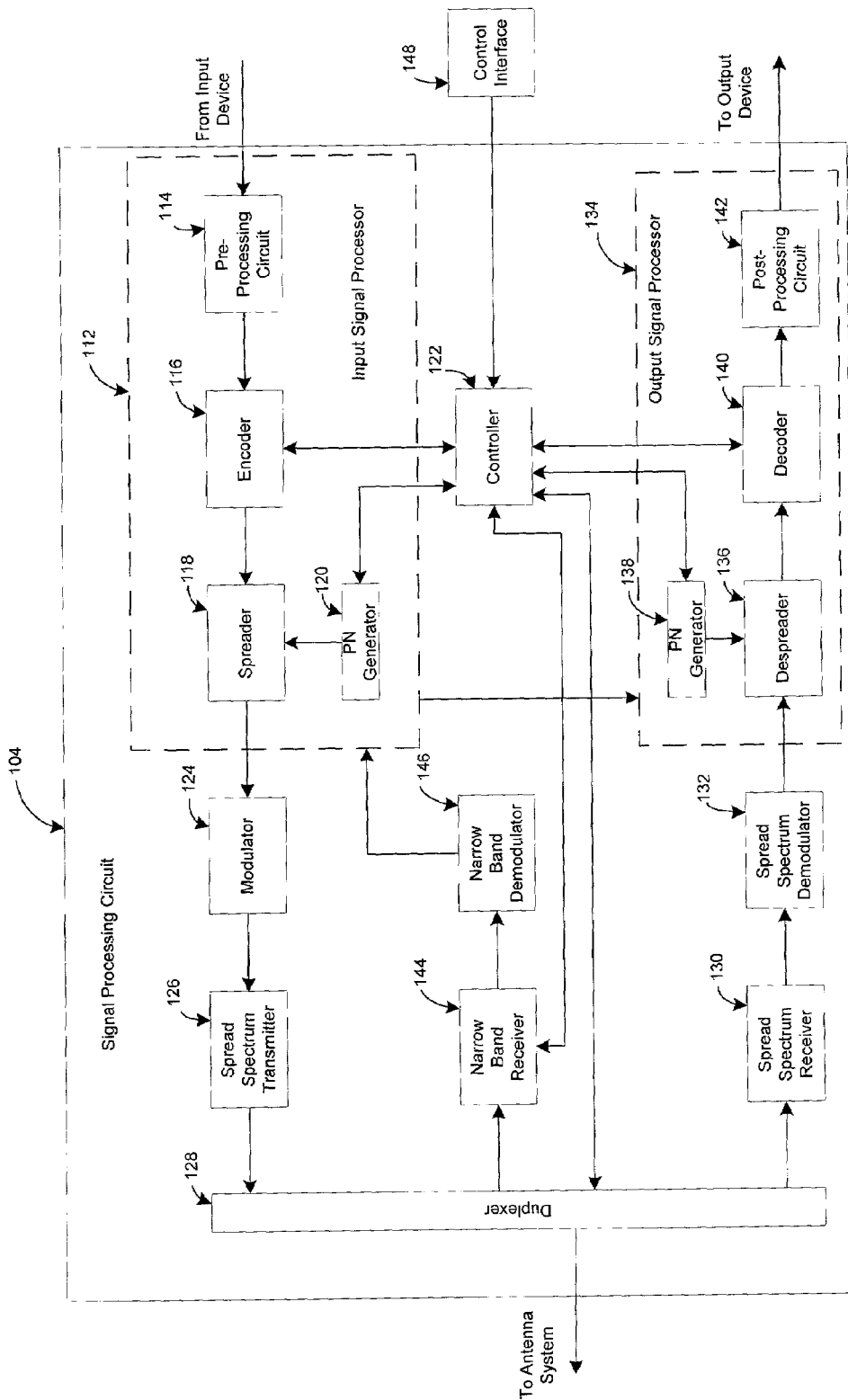
FIG. 2 represents a block diagram of the signal processing circuit shown in FIG. 1.

FIG. 2 represents a block diagram of the signal processing circuit 104 shown in FIG. 1 according to one embodiment. The signal processing circuit 104 provides an output spread spectrum signal to the antenna system 110 in response to the input communication signal from the input device 106. In one aspect, the output signal spectrum signal is implement using a CDMA protocol. The signal processing circuit 104 also provides the output communication signal to the output device 108 in response to an input spread spectrum signal, a narrow band signal, or a combination thereof. The signal processing circuit 104 essentially uses one or more components to process both the narrow band and spread spectrum signals. In one aspect, the input spread spectrum signal comprises a CDMA signal. The narrow band signal comprises an AM signal or an FM signal. The signal processing circuit 104 may have other configurations and arrangements including those with fewer or additional components.

In the signal processing circuit 104, an input signal processor 112 receives the input communication signal from the input device 106. The input processor 112 has a processing circuit 114, an encoder 116, a spreader 118, and a pseudonoise (PN) generator 120. The preprocessing circuit 114, the encoder 116, and the PN generator 120 are connected to a controller 122, which may be a microprocessor or the like. The preprocessing circuit 114 comprises an analog-to-digital converter (not shown), an anti-aliasing filter (not shown), and may have other or additional components. The preprocessing circuit 114 essentially filters and converts the input communication signal into a digital signal. This preprocessing may be partially or completely done by the input device 106. The encoder 116 receives and encodes the input communication signal in accordance with the CDMA standard being used. The spreader 118 receives the encoded input signal and receives a set of pseudonoise (PN) sequences from the PN generator 120. The spreader 118 spreads the encoded input signal in response to the PN sequences, thus creating a spread input signal.

A modulator 124 receives the spreaded input signal from the spreader 118 in the input signal processor 112. The modulator 124 modulates the spread input signal with a frequency carrier signal from an oscillator or similar frequency generation device (not shown). The modulator 124 provides an intermediate frequency (IF) input signal to a transmitter 126.

The transmitter 126 amplifies and converts the IF input signal into a radio frequency (RF) input signal. The transmitter 126 routes the RF input signal through a duplexer 128 to transmit the RF input signal as a spread spectrum signal through the antenna system 110. The spread spectrum signal may be a cellular or PCS signal as previously discussed. The duplexer 128 coordinates the transmission and reception of signals with the antenna system 110. The transmitter 126 may route the RF input signal directly to the antenna system 110.

In the signal processing circuit 104, the duplexer 128 also provides a spread spectrum signal to a spread spectrum receiver 130 from the antenna system 110. The spread spectrum signal may be a cellular signal or PCS signal as previously described. The spread spectrum receiver 130 amplifies, filters, and converts the spread spectrum signal into an intermediate frequency (IF) spread spectrum signal. A spread spectrum demodulator 132 receives and demodulates the IF spread spectrum signal in response to an oscillator or similar frequency generation device (not shown).

An output signal processor 134 receives the demodulated spread spectrum signal from the spread spectrum demodulator 132. The output signal processor 134 comprises a despreader 136, a pseudonoise (PN) generator 138, a decoder 140, and a post processing circuit 142. The PN generators 138 and 120 may comprise the same PN generator or form a PN generation circuit. The PN generator 138, the decoder 140, and the post processing circuit 142 are connected to the controller 122.

The despreader 136 despreads the demodulated spread spectrum signal in response to pseudonoise (PN) sequences from the PN generator 138. The despreader 136 provides a coded output signal to the decoder 140, which decodes the coded output signal. The decoder 140 provides a digital output signal to the post processing circuit 142. The post processing circuit 142 has a digital to analog converter (not shown), one or more amplifiers (not shown), and other or additional circuitry for processing the digital output signal. The post processing circuit 142 provides the output communication signal to the output device 108. The output communication signal may be a first output audio or first output data signal or combination thereof.

In the signal processing circuit 104, the duplexer 128 also provides a narrow band signal to a narrow band receiver 144 from the antenna system 110. The narrow band signal may be a AM or FM signal as previously described. The narrow band receiver 144 comprises one or more amplifiers (not shown), a mixer (not shown), and may have other components. The narrow band receiver 144 provides an intermediate frequency (IF) or multiplex (MPX) narrow band signal to the narrow band modulator 146, which may comprise the same demodulator or form a demodulation circuit with the spread spectrum demodulator 132. The narrow band demodulator 146 receives and demodulates the IF or MPX narrow band signal. The narrow band demodulator 146 provides the demodulated narrow band signal to the input signal processor 112, which processes the demodulated narrow band signal essentially as the input communication signal previously described.

The input signal processor 112 transforms the narrow band signal into a spread spectrum-like signal. In one aspect, the input signal processor 112 uses a reserved PN sequence or some other sequence dissimilar to the PN sequence used for the input communication signal or the input spread spectrum signal. The reserved PN sequence may be a sequence with a different length. The input signal processor 112 generates the spread spectrum-like signal in response to the reserved PN sequence. In another aspect, the input signal processor 112 does not pass the narrow band signal through the encoder 116 thus avoiding the decoding in the output signal processor 134. In a further aspect, the narrow band signal passes through just the spreader 118.

Spread spectrum-like includes the various resultant signal forms of converted or processed narrow band signals that can be further processed by a spread spectrum despreader. Spread spectrum-like signals may be partially or entirely spread spectrum signals. Spread spectrum-like also includes the resultant signal forms of narrowband signals that a spread spectrum despreader can further process into communication signals.

The output signal processor 134 receives the spread spectrum-like signal from the input signal processor 112. The output signal processor 134 converts the spread spectrum-like signal into an output communication signal essentially the same way as the demodulate spread spectrum signal is converted. In one aspect, the output signal processor 134 provides a second output audio signal to the output device 108 in response to the spread spectrum-like signal. In another aspect, the output signal processor 134 does not decode the spread spectrum-like signal. In a further aspect, the despreader 136 comprises a spread spectrum despreader and a narrow band despreader to process the demodulated spread spectrum and the spread spectrum-like signals respectively. In yet a further aspect, the post-processing circuit 142 comprises a spread spectrum post-processor and a narrow band post-processor to process the spread spectrum and the spread spectrum-like signals respectively. The spread spectrum post-processor provides the first output audio or data signal to the output device 108. The narrow band post-processor provides the second output audio signal to the output device 108. The post-processing circuit 142 may provide the first and second output audio signals to the same or different speakers. The post processing circuit 142 may stop transmission or reduce the volume of the second audio signal when the first audio signal is present.

The controller 122 also is connected to a control interface 148 and the duplexer 128. The control interface 148 provides command signals to the controller 122 for operation of the signal processing circuitry 104. The control interface 140 may be a touch screen, key pad, or the like and m ay be integrated with the input device 106 or the output device 108.

The controller 122 may activate or deactivate the narrow band receiver 144 in response to one or more command signals from the control interface 148 or in response to operation of the input signal or output signal processors 112 and 134. A user may activate the narrow band receiver 144 to receive a narrow band signal such as an AM or FM radio signal. The controller 122 may deactivate the narrow band receiver 144 when an input spread spectrum signal is detected or when the input signal processor 112 is activated for processing an input communication signal. The controller 122 also may deactivate the narrow band receiver 144 when the output signal processor 134 is activated for processing an input spread spectrum signal from the spread spectrum receiver 130.

Figure 3:
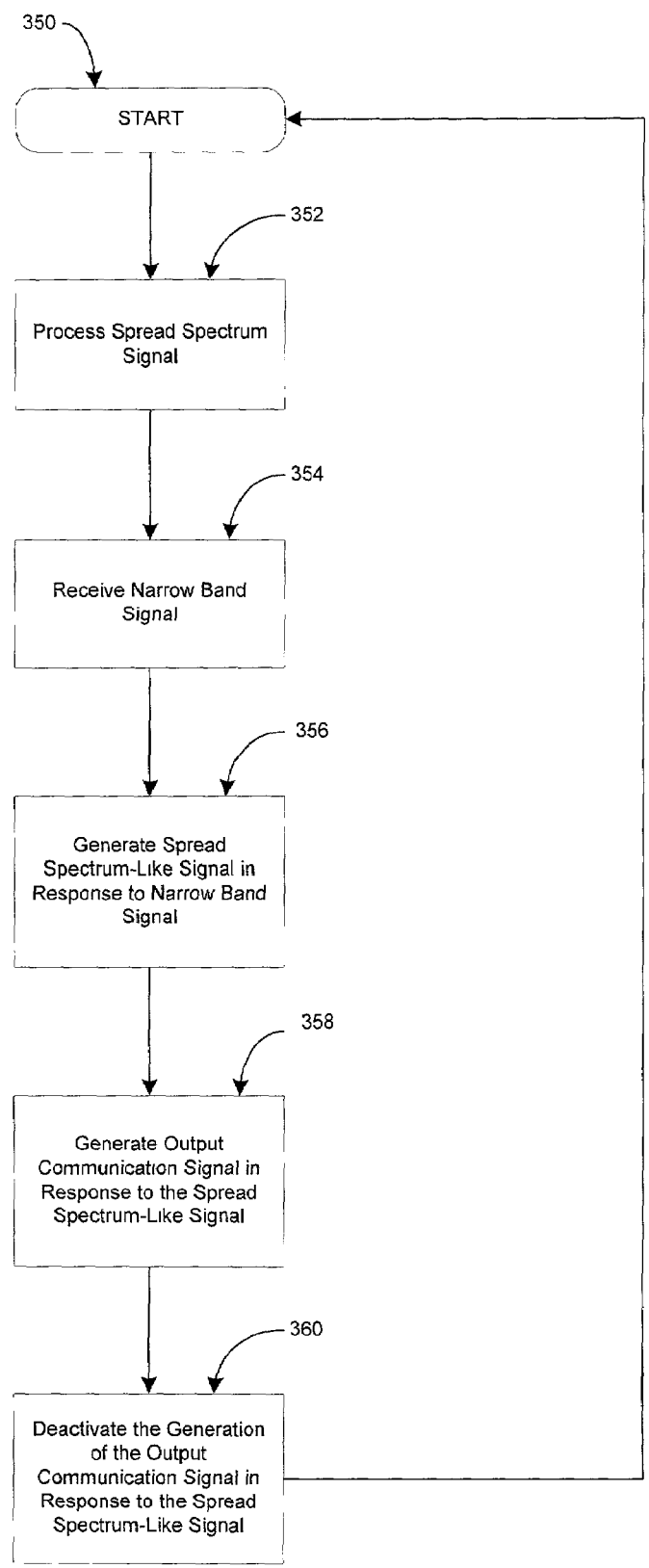
FIG. 3 is a flow chart of a method for integrating narrow band and spread spectrum signals in a vehicle communication system according to an embodiment.

FIG. 3 is a flow chart of a method for integrating narrow band and spread spectrum signals in a vehicle communication system according to an embodiment. At start 350, the vehicle communication system is activated or powered-up. The vehicle communication system processes 352 one or more spread spectrum signals as previously discussed. An output spread spectrum signal may be generated in response to an input communication signal, which may be an audio or data input signal. An output communication signal may be generated in response to an incoming spread spectrum signal.

The vehicle communication system receives 354 a narrow band signal, which may be an AM or FM signal as previously discussed. The vehicle communication system generates 356 a spread spectrum-like signal in response to the narrow band signal. The vehicle communication system uses part or all of an input signal processor to generate the spread spectrum-like signal from the narrow band signal. The input signal processor also generates the output spread spectrum signal in response to the input communication signal.

The vehicle communication system generates 358 the output communication signal in response to the spread spectrum-like signal as previously discussed. The output communication signal may comprise one or more output audio and data signals. The output communication signal may comprise a first output audio signal and a second output audio signal. The first audio output signal is in response to a spread spectrum signal. The second audio output signal is in response to a spread spectrum-like signal, which is responsive to a narrow band signal.

The vehicle communication system deactivates 360 the generation of the spread spectrum-like signal from the narrow band signal. The deactivation of the spread spectrum-like generation may be in response to an input command signal triggered by a user. The deactivation of the spread spectrum-like generation may be in response to the spread spectrum signal processing. After deactivation, the vehicle communication system returns to start 350.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. A narrow band and spread spectrum communication system for a vehicle, comprising:
a signal processing circuit; and an antenna system connected to the signal processing circuit, the antenna system operable to receive a narrow band signal and an input spread spectrum signal, where the signal processing circuit is operable to generate a spread spectrum-like signal in response to the narrow band signal; and
where the signal processing circuit is operable to generate an output communication signal in response to at least one of the spread spectrum-like signal and the input spread spectrum signal;
an input signal processor connected to an input device and the antenna system, the input signal processor operable to generate an output spread spectrum signal in response to an input communication signal from the input device; an output signal processor connected to an output device and the antenna system, the output signal processor operable to generate the output communication signal in response to the input spread spectrum signal; and
a narrow band receiver connected to the antenna system and the input signal processor, the narrow band receiver operable to ptvide the narrow band signal from the antenna system to the input signal processor,
where the input signal processor is operable to generate a spread spectrum-like signal in response to the narrow band signal; and where the output signal processor is operable to generate the output communication signal in response to the spread spectrum-like signal.

2. The communication system according to claim 1, where the antenna system comprises a multimode antenna.

3. The communication system according to claim 1, where the antenna system comprises a first antenna and a second antenna, the first antenna responsive to the narrow band signal, the second antenna responsive to the input spread spectrum signal.

4. The communication system acoording to claim 1, where the narrow band signal comprises at least one of an amplitude modulation (AM) signal and a frequency modulation (FM) signal.

5. The communication system according to claim 4, where the AM signal comprises a frequency within the range of about 550 KHZ through about 1610 KHz, and where the FM signal comprises a frequency within the range of about 88 MHz through about 108 MHz.

6. The communication system according to claim 1, where the input spread spectrum signal comprises a code division multiple access (CDMA) signal.

7. The communication system according to claim 6, where the input spread spectrum signal comprises a frequency of about 800 MHz.

8. The communication system according to claim 6, where the spread spectrum signal comprises a frequency of about 1900 MHz.

9. The communication system according to claim 1, where the output communication signal comprises a first output audio signal and a second output audio signal, the first output audio signal responsive to the spread spectrum signal, the second output audio signal responsive to the narrow band signal.

10. The communication system according to claim 9, where the second output audio signal is deactivated in response to the first output audio signal.

11. The communication system according to claim 1, where the output communication signal comprises at least one of an audio signal and a data signal.

12. The communication system according to claim 11, wherein the
output signal processor is connected to the input signal processor.

13. The communication system according to claim 12, where the input signal processor comprises a spreader connected to the narrow band receiver and the output signal processor, the spreader to spread the narrow band signal in response to a pseudonoise (PN) sequence provided by a PN generator.

14. The communication system according to claim 12, where the output signal processor comprises a despreader connected to the input signal processor, the despreader to despread the spread spectrum-like signal in response to a pseudonoise (PN) sequence provided by a PN generator.

15. The communication system according to claim 14, where the despreader comprises a first despreader and a second despreader, the first despreader responsive to the input spread spectrum signal, the second despreader responsive to the spread spectrum-like signal.

16. The communication system according to claim 12, further comprising: an input device connected to the input signal processor, and an output device connected to the output signal processor.

17. The communication system according to claim 16, where the input device and the output device comprise a portable device.

18. The communication system according to claim 12, further comprising a first speaker and a second speaker connected to the output signal processor, the first speaker responsive to the narrow band signal, the second speaker responsive to the input spread spectrum signal.

19. The communication system according to claim 12, where the narrow band signal comprises at least one of an amplitude modulation (AM) signal and a frequency modulation (FM) signal.

20. The communication system according to claim 19, where the AM signal comprises a frequency within the range of about 50 KHz through about 1610 KHz, and where the FM signal comprises a frequency with the range of 88 MHz through about 108 MHz.

21. The communication system according to claim 12, where the input and output spread spectrum signals comprise code division multiple access (CDMA) signals.

22. The communication system according to claim 21, where the CDMA signals have a frequency of about 500 MHz.

23. The communication system according to claim 21, where the CDMA signals have a frequency of about 1900 MHz.

24. The communication system according to claim 12, where the output communication signal comprises at least one of an audio signal and a data signal.

* * * * *

UNITED STATES PATENT AND TRADEMARK OFFICE
CERTIFICATE OF CORRECTION

PATENT NO. : 6,968,204 B2 Page 1 of 1
APPLICATION NO. : 10/040854
DATED : November 22, 2005
INVENTOR(S) : J. William Whikehart et al.

It is certified that error appears in the above-identified patent and that said Letters Patent is hereby corrected as shown below:

Column 7,
Line 27, after "operable to" delete "ptvide" and substitute -- provide --.

Column 8,
Line 30, after "signal processor" delete "," and substitute -- ; --.
Line 54, after "frequency of about" delete "500" and substitute -- 800 --.

Signed and Sealed this

Twentieth Day of June, 2006

JON W. DUDAS
*Director of the United States Patent and Trademark Office*